United States Patent Office

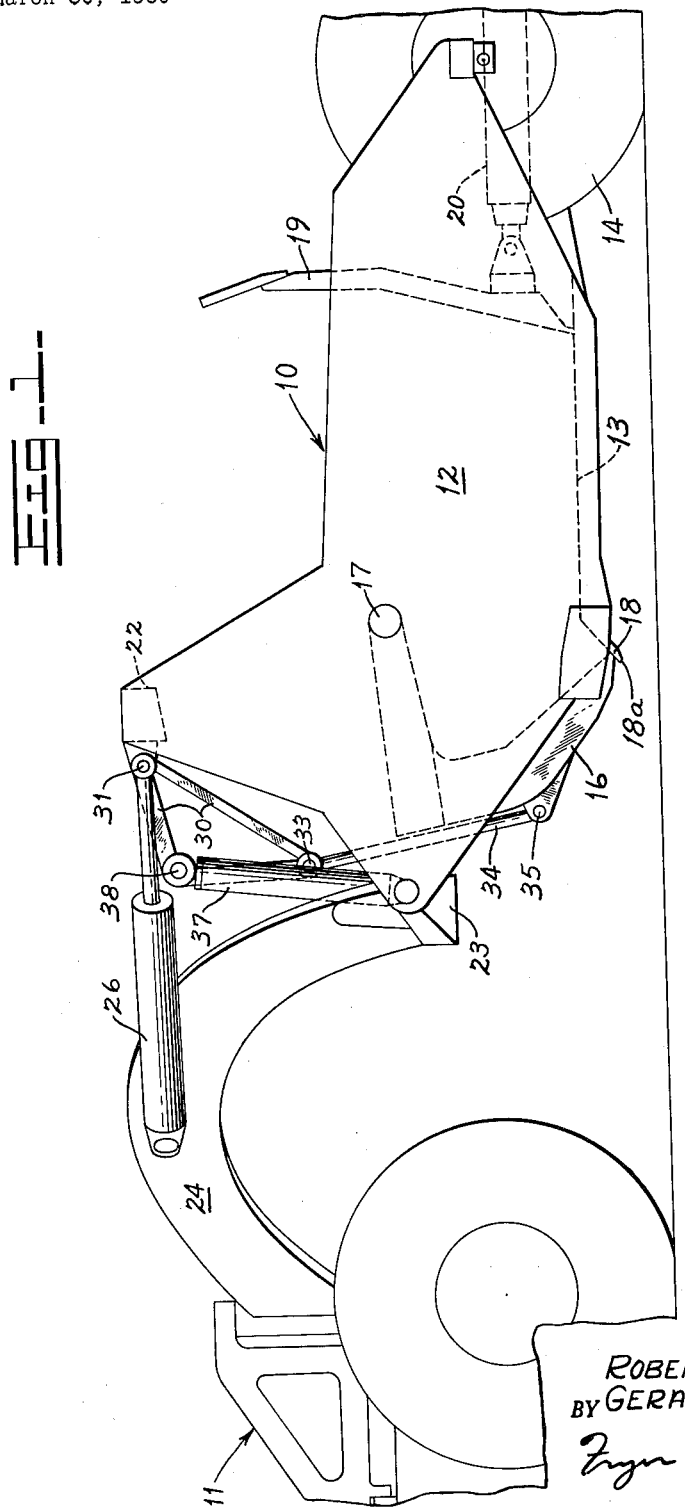

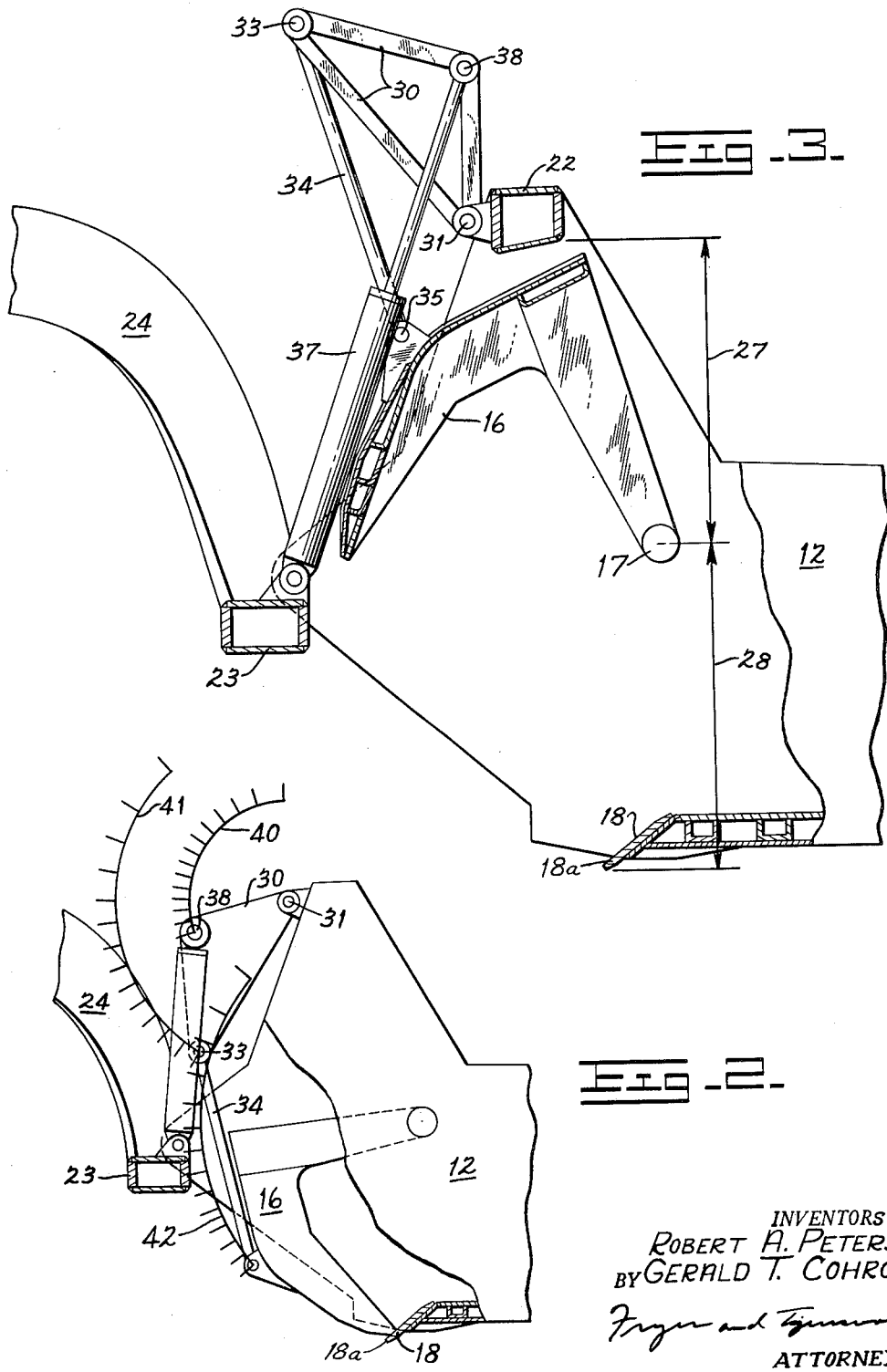

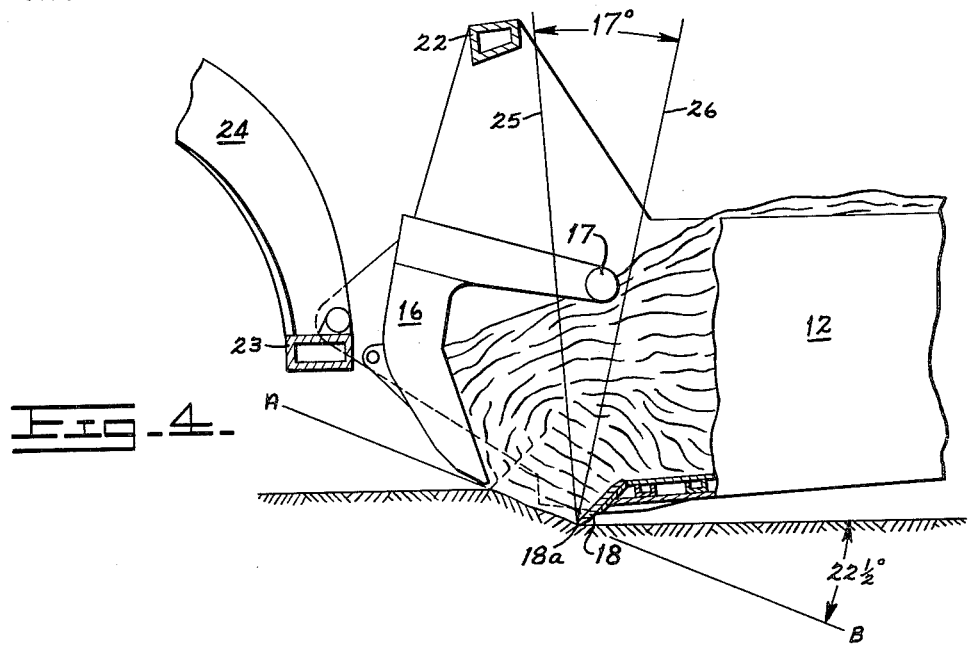
Fig-4-
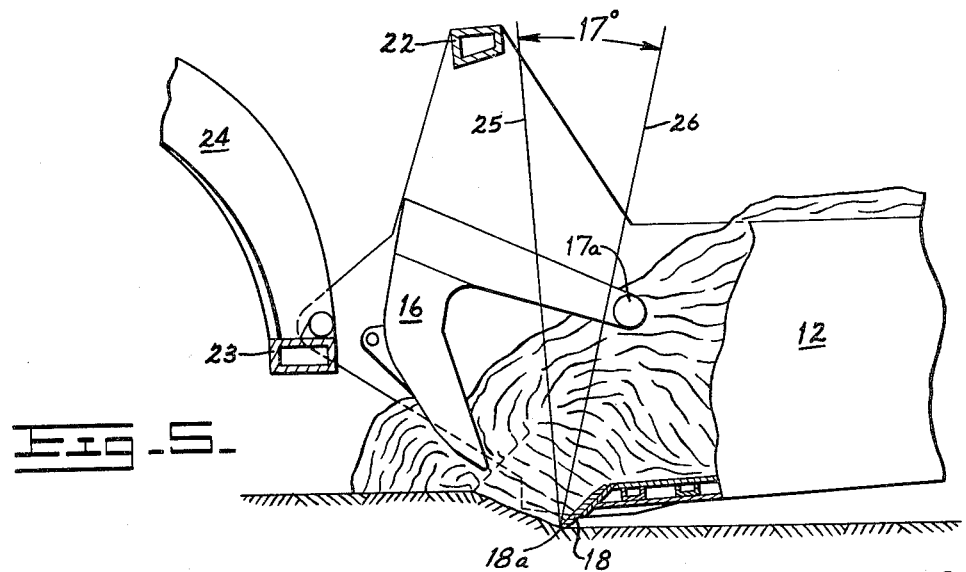
Fig-5-
INVENTORS
ROBERT A. PETERSON
BY GERALD T. COHRON
ATTORNEYS

3,035,361
Patented May 22, 1962

3,035,361
APRON ARRANGEMENT FOR EARTH-
MOVING SCRAPERS
Robert A. Peterson, San Leandro, Calif., and Gerald T. Cohron, East Peoria, Ill., assignors to Caterpillar Tractor Co., Peoria, Ill., a corporation of California
Filed Mar. 30, 1960, Ser. No. 18,752
3 Claims. (Cl. 37—129)

This invention relates to earthmoving scrapers and particularly to the arrangement of aprons thereon and to the mechanism for actuating such aprons or moving them beween their open and closed positions.

One of the optimum objectives in the operation of earthmoving scrapers is to effect the collection of all of the earth disturbed by the cutting edge of the scraper. Most conventional scrapers include a front closure member or apron which during forward movement or loading of the scraper with its cutting edge beneath the surface of the earth is held in a partially open position just above the surface of the earth. In this position, the apron aids in retaining the collected earth in the bowl and is in position to be closed against the scraping edge of the bowl when it is full in preparation for raising the bowl and transporting the load.

This position of the apron just in advance of the cutting edge of the bowl has given rise to an undesirable condition because some of the earth moved by the cutting edge is often raised above normal ground level in advance of the apron with the result that it gathers in front of the apron and is pushed or bulldozed by the apron throughout the loading cycle. On the other hand an apron too far in front of or above the bowl does not properly retain the partial load and the earth already in the bowl bears against and pushes the earth which is in advance of the cutting edge. In either case, this pushing of earth which is not being loaded into the bowl represents a waste of power and reduces the speed and efficiency of the earthmoving operation.

The problems set forth above are overcome by the present invention by a novel position of the apron which will hereinafter be described in detail. Positioning of the apron, however, is such that it will not close by gravity when the bowl is full.

The present invention also provides means to effect power actuated closing of the bowl through linkage, the geometry of which is such that a greater leverage or moment arm is obtained when the apron is moving toward its closed position where greater force is required. This makes possible a saving in power and the size of the power equipment employed for this purpose may be kept at a minimum.

It is the object, therefore, of the present invention to provide an improved apron design and operating mechanism for earthmoving scrapers which results in improved efficiency in the operation of the scraper.

Further and more specific objects and advantages of the invention and the manner in which it is carried into practice are made apparent in the following specification wherein reference is made to the accompanying drawings.

In the drawings:

FIG. 1 is a view in side elevation of an earthmoving scraper having an apron and apron operating mechanism embodying the present invention;

FIG. 2 is a fragmentary schematic view illustrating advantages of the apron operating linkage;

FIG. 3 is a fragmentary view illustrating the apron in its raised position;

FIG. 4 is a fragmentary view illustrating the advantages of an apron disposed in the manner taught by the present invention; and FIG. 5 is a view similar to FIG. 4 illustrating disadvantages resulting from improper positioning of a scraper apron.

The scraper illustrated in FIG. 1 is generally indicated at 10 as being drawn by a tractor, the rear portion only of which is shown at 11. The scraper comprises a bowl having side walls 12 and a bottom 13 supported at its rear end by wheels as indicated at 14. The forward end of the bowl may be closed by an apron 16 pivotally supported to the side walls of the bowl as at 17 and adapted to close as in the position shown with its lower edge or lip engaging a cutting blade 18 which extends across the front portion of the bowl bottom 13. The apron is raised to admit earth cut by the forward or cutting edge 18a into the bowl and also to permit ejection of the earth from the bowl as by an ejector 19 which forms a rear wall for the bowl and is advanceable therethrough as by jacks one of which is indicated at 20, this being conventional construction and practice.

At their forward ends, the side walls 12 of the scraper bowl are separated and rigidly braced by spreaders such as illustrated at 22 and 23 and a draft frame 24 extends between the spreader 23 and a point of connection with the tractor 11. A pair of hydraulic jacks, one of which is illustrated at 26, extends between the draft frame and the spreader 22 and is included in a hydraulic circuit, not shown, for effecting raising and lowering of the scraper bowl and its cutting blade 18 with respect to the ground.

One of the principal advantages of the present invention is derived from the particular mounting of the apron 16 which enables its lip during loading of the scraper bowl always to occupy a certain position relative to the soil failure plane. This soil failure plane represented by the line AB in FIG. 4 is the plane upon which the soil fractures due to forward movement of the cutting edge 18a through it. This plane or angle varies of course with different types of soil and under different moisture conditions which produce different values for the angle of internal friction of the soil. It has been determined, however, by testing of many different types of soil and by experimenting with actual cuts at different depths that the plane of soil failure will, except for certain unusual types of soil such as loose sand etc., fall on an angle of approximately 22½°, as shown in FIG. 4, to the surface over which the cutting edge is passing. This may be considered the minimum angle of the soil failure plane for practical purposes and under all but very extreme operating conditions. It is desirable, therefore, that the apron 16 be pivotally supported at a point that will cause its leading edge or lip to swing just slightly below this angle so that it may be adjusted as shown in FIG. 4 with its lip approximately at the forward edge of the soil failure plane for any ordinary depth of cut. The apron pivot 17 is, therefore, disposed adjacent a line 25 in FIG. 4 which extends perpendicularly to the bottom of the bowl from the cutting edge and no greater distance rearwardly from said line than a second line 26 forming an angle of about 17° therewith. The vertical spacing of a pivot point 17 is preferably as indicated in FIG. 3, approximately midway between the elevation of the cutting edge 18a and the lower portion of the spreader 22 so that the dimensions represented by arrows 27 and 28 are substantially the same. This provides clearance between the apron and the spreader 22 when the apron is in its wide open position as illustrated and maximum clearance between the apron lip and cutting edge during ejection of a load from the bowl.

As shown in FIG. 5 of the drawings where the apron pivot is located at 17a, a short distance rearwardly of the 17° angle represented by the lines 25 and 26, the apron lip is not disposed forwardly of the forward edge of the soil failure plane during loading. Therefore as the load in the scraper bowl grows larger and the force resisting the incoming column of soil increases, the soil crumbles near the forward edge of the failure plane and is forced forwardly in front of the apron so that it is bulldozed or pushed ahead of the apron increasing loading resistance and the tractor effort required to load a scraper bowl. If on the other hand the apron pivot is located forwardly of the line 25, the lip of the apron will be disposed too far ahead of the forward edge of the soil failure plane and soil will pile up in front of the column of soil which is entering the bowl so that it is pushed along the ground by the load within the bowl rather than by the apron as previously described but also resulting in increased loading resistance and inefficient operation.

The disposition of the apron to obtain the advantages hereinabove disclosed results in an apron that is difficult to close particularly at its lower or partially closed position. This is apparent from a comparison of FIGS. 4 and 5 wherein it can be seen that gravity favors closing of the apron in FIG. 5 more so than it does in FIG. 4 where a greater force is required for the final closing movement of the apron.

To enable the opening and closing of the apron of the present invention without undue force and unusually large mechanical components, a triangular lever 30, best shown in FIGS. 1 and 3, is pivotally connected at one end of its base adjacent the spreader 22 as shown at 31 and at the opposite end of its base is pivotally connected as at 33 to a link 34 pivoted as at 35 to the front of the apron 16. Two hydraulic jacks, one of which is illustrated at 37, are pivotally connected between the spreader 23 and the apex of the triangular lever as shown at 38. With the foregoing construction when the apron 16 is in its fully closed position, the jacks 37 lie in substantially the same plane transversely of the scraper as the line of force tending to lift the apron or in other words nearly parallel to the link 34. This provides a high mechanical advantage which permits maximum utilization of the force exerted by the jacks for a given fluid pressure at the time when the apron is being moved out from beneath the load during opening as well as during the last stage of its closing. Futhermore as the opening increases and the relationship of the pivot points in the operating linkage changes, a progressive decrease in the effective moment arm takes place to provide an acceleration of the apron speed in relation to the speed at which the jacks are extended. This is illustrated schematically in FIG. 2 of the drawing where an arc 40 illustrates the path of travel of the pivot point 38 between the jacks and the triangular lever 30. This arc is divided into spaces representing equal increments of jack extension. An arc 41 represents the path of movement of the pivotal connection 33 between the lever 30 and the link 34 and is divided into increments representing movement corresponding to the increments of jack extension shown on the arc 40. The third arc 42 is divided to indicate corresponding increments of apron movement in relation to the equal increments of jack travel indicated on the arc 40. Thus the progressively longer increments into which the arc 42 is divided illustrate that the apron moves progressively greater distances for each fixed increment of jack extension during its upper range of movement and a greater mechanical advantage is obtained through the lower range of movement. Not only does the apron operating linkage herein described provide a desired mechanical advantage but it is compact occupying very little longitudinal space on the scraper and, since the lever 30 is disposed directly above the apron and rotates in the same direction, the disposition of the linkage does not interfere with the loading and unloading operation.

We claim:

1. In an earthmoving scraper having a bowl with a forwardly disposed cutting edge and an apron for closing the front of the bowl with a lip registering with said cutting edge, the improvement which comprises a pivotal support between the apron and the bowl positioned to cause the lip of the apron when on the surface of the ground and with the cutting edge at an average cutting depth to be substantially coincident with a point of intersection of the undisturbed soil surface and a plane extending forwardly and upwardly from said cutting edge at an angle of approximately twenty-two and one-half degrees to the plane of travel of the cutting edge.

2. In an earthmoving scraper with a bowl, a bottom, and side walls, a cutting edge disposed forwardly of the bottom, a spreader beam between the side walls above the cutting edge, and a pivoted apron forming a closure for the front of the bowl, the improvement which comprises pivotal connections between the apron and the side walls of the bowl disposed on a common axis which is substantially midway between the cutting edge and the spreader beam and adjacent a plane normal to the bottom of the bowl and intersecting the cutting edge.

3. In an earthmoving scraper with a bowl, a bottom, and side walls, a cutting edge disposed forwardly of the bottom, a spreader beam between the side walls above the cutting edge, and a pivoted apron forming a closure for the front of the bowl, the improvement which comprises pivotal connections between the apron and the side walls of the bowl disposed on a common axis which is substantially midway between the cutting edge and the spreader beam and included between two planes intersecting the cutting edge one of which is normal to the bottom of the bowl and the other of which is inclined not more than seventeen degrees rearwardly of the first plane.

References Cited in the file of this patent

UNITED STATES PATENTS

| | | |
|---|---|---|
| 2,214,240 | Allin | Sept. 10, 1940 |
| 2,252,763 | French | Aug. 19, 1941 |
| 2,318,190 | Berner | May 4, 1943 |